United States Patent
Horiuchi et al.

(10) Patent No.: US 7,134,026 B2
(45) Date of Patent: Nov. 7, 2006

(54) DATA TERMINAL DEVICE PROVIDING BACKUP OF UNIQUELY EXISTABLE CONTENT DATA

(75) Inventors: Keiji Horiuchi, Gifu (JP); Takatoshi Yoshikawa, Ogaki (JP); Toshiaki Hioki, Ogaki (JP); Yoshihiro Hori, Gifu (JP)

(73) Assignee: Sanyo Electric Co. Ltd., Osaka (JP)

( * ) Notice: Subject to any disclaimer, the term of this patent is extended or adjusted under 35 U.S.C. 154(b) by 865 days.

(21) Appl. No.: 10/152,576

(22) Filed: May 23, 2002

(65) Prior Publication Data

US 2002/0176580 A1    Nov. 28, 2002

(30) Foreign Application Priority Data

May 24, 2001    (JP)    ............... 2001-154787

(51) Int. Cl.
*G06F 11/30* (2006.01)
*G06F 12/14* (2006.01)
*H04L 9/32* (2006.01)
*H04K 1/00* (2006.01)
*G06Q 99/00* (2006.01)
*H04N 7/167* (2006.01)

(52) U.S. Cl. .................. 713/193; 705/57; 705/58; 705/59; 380/201; 380/202

(58) Field of Classification Search ............... 713/193; 705/57, 58, 59
See application file for complete search history.

(56) References Cited

U.S. PATENT DOCUMENTS

| | | | |
|---|---|---|---|
| 5,715,403 A * | 2/1998 | Stefik ........................... | 705/44 |
| 5,758,068 A | 5/1998 | Brandt et al. ................ | 395/186 |
| 5,915,021 A * | 6/1999 | Herlin et al. .................. | 705/67 |
| 6,085,323 A * | 7/2000 | Shimizu et al. .............. | 713/150 |
| 6,185,683 B1 * | 2/2001 | Ginter et al. ................ | 713/176 |
| 6,223,288 B1 | 4/2001 | Byrne .......................... | 713/190 |
| 6,367,019 B1 * | 4/2002 | Ansell et al. ................ | 726/26 |
| 6,772,133 B1 * | 8/2004 | Kambayashi et al. ......... | 705/57 |
| 2002/0010681 A1 * | 1/2002 | Hillegass et al. ............. | 705/59 |
| 2002/0049679 A1 * | 4/2002 | Russell et al. ................ | 705/52 |
| 2002/0065780 A1 * | 5/2002 | Barritz et al. ................ | 705/59 |
| 2002/0091644 A1 * | 7/2002 | Wong et al. .................. | 705/59 |

FOREIGN PATENT DOCUMENTS

| | | |
|---|---|---|
| EP | 1 209 657 A1 | 5/2002 |
| EP | 1 221 690 A1 | 7/2002 |
| WO | WO 01/13358 A1 | 2/2001 |
| WO | WO 01/16932 A1 | 3/2001 |

\* cited by examiner

*Primary Examiner*—Ayaz Sheikh
*Assistant Examiner*—Shin-Hon Chen
(74) *Attorney, Agent, or Firm*—Westerman, Hattori, Daniels & Adrian, LLP.

(57) ABSTRACT

In a cellular phone, a controller stores content data received from a distribution server into a memory. When the content data is to be transmitted to a memory card, a random number key generator generates a license key, and an encryption processing unit encrypts the content data using the license key. The controller transmits encrypted content data to a memory card via a memory card interface. Then, the controller deletes the content data stored in the memory. As a result, distribution of content data that must be deleted when transferring to another apparatus can be facilitated while protecting the copyright.

7 Claims, 9 Drawing Sheets

FIG.2

| SYMBOL | TYPE | ATTRIBUTE | CHARACTERISTICS |
|---|---|---|---|
| Dc | CONTENT DATA | UNIQUE CONTENT | EXAMPLE: PROGRAM TO DISPLAY IMAGE, GAME PROGRAM. DISTRIBUTED AS Dc, AND STORED IN DATA TERMINAL DEVICE OR MEMORY CARD |
| Kc | LICENSE | UNIQUE CONTENT | LICENSE DECRYPTION KEY REQUIRED TO DECRYPT ENCRYPTED CONTENT DATA |
| ACm | LICENSE | UNIQUE LICENSE | RESTRICT INFORMATION RESTRICTION ON LICENSE HANDLING |
| CONTENT ID | LICENSE | UNIQUE CONTENT | ADMINISTRATION CODE TO IDENTIFY CONTENT |
| LICENSE ID | LICENSE | UNIQUE LICENSE | ADMINISTRATION CODE TO IDENTIFY LICENSE |
| LICENSE | LICENSE | UNIQUE LICENSE | GENERIC TERM OF Kc+ACm+CONTENT ID AND LICENSE ID |

FIG.3

| | SYMBOL | TYPE | ATTRIBUTE | CHARACTERISTICS |
|---|---|---|---|---|
| DATA TERMINAL DEVICE | KPa | PUBLIC AUTHENTICATION KEY | PCOMMON TO SYSTEM | KEY REQUIRED TO DECRYPT AUTHENTICATION DATA AT CERTIFICATE AUTHORITY |
| | Ks1 | COMMON KEY | UNIQUE TO SESSION | GENERATED AT THE TIME OF STORING CONTENT DATA AND LICENSE INTO MEMORY CARD |
| | KPpy | PUBLIC ENCRYPTION KEY | UNIQUE TO CLASS | STORED AS AUTHENTICATION DATA ENCRYPTED IN CERTIFICATEAUTHORITY TOGETHER WITH CERTIFICATE CMW. y IS IDENTIFIER TO IDENTIFY CLASS |
| | Kpy | SECRE DECRYPTION KEY | UNIQUE TO CLASS | ASYMMETRIC DECRYPTION KEY REQUIRED TO DECRYPTENCRYPTED DATA WITH PUBLIC ENCRYPTION KEY KPpy |
| | Ks4 | COMMON KEY | UNIQUE TO SESSION | GENERATED AT THE TIME OF RECEIVING CONTENT DATA AND LICENSE FROM MEMORY CARD |
| | Cpy | CERTIFICATE | CLASS CERTIFICATE | CLASS CERTIFICATE OF DATA TERMINAL DEVICE. INCLUDES AUTHENTICATION CAPABILITY. RECORDED AT THE TIME OF SHIPMENT IN THE FORM OF {KPpy//Cpy}KPa. *DIFFERS FOR EACH CLASS Y OF DATA TERMINAL DEVICE |
| MEMORY CARD | KPa | PUBLIC AUTHENTICATION KEY | COMMON TO SYSTEM | KEY REQUIRED TO DECRYPT AUTHENTICATION DATA AT CERTIFICATE AUTHORITY IDENTICAL TO KPa OF DATA TERMINAL DEVICE |
| | KPmw | PUBLIC ENCRYPTION KEY | UNIQUE TO CLASS | STORED AS AUTHENTICATION DATA ENCRYPTED AT CERTIFICATE AUTHORITY TOGETHER WITH CERTIFICATE CMW. w IS IDENTIFIER TO IDENTIFY CLASS |
| | Kmw | SECRET DECRYPTION KEY | UNIQUE TO CLASS | ASYMMETRIC DECRYPTION KEY REQUIRED TO DECRYPT DATA ENCRYPTED WITH PUBLIC ENCRYPTION KEY KPmw |
| | KPmcx | PUBLIC ENCRYPTION KEY | UNIQUE | DIFFERS FOR EACH MEMORY CARD. x IS IDENTIFIER TO IDENTIFY MODULE |
| | Kmcx | SECRET DECRYPTION KEY | UNIQUE | ASYMMETRIC DECRYPTION KEY REQUIRED TO DECRYPT DATA ENCRYPTED WITH PUBLIC ENCRYPTION KEY KPmcx |
| | Ks2 | COMMON KEY | UNIQUE TO SESSION | GENERATED AT THE TIME OF RECEPTION OF CONTENT DATA AND LICENSE |
| | Ks3 | COMMON KEY | UNIQUE TO SESSION | GENERATED AT THE TIME OF STORING CONTENT DATA AND LICENSE INTO DATA TERMINAL DEVICE |
| | Cmw | CERTIFICATE | CLASS CERTIFICATE | CLASS CERTIFICATE OF MEMORY CARD. INCLUDES AUTHENTICATION CAPABILITY. RECORDED AT THE TIME OF SHIPMENT IN THE FORM OF {KPmw//Cmw}KPa. *DIFFERS FOR EVERY CLASS w OF MEMORY CARD |

DATA TERMINAL DEVICE PROVIDING BACKUP OF UNIQUELY EXISTABLE CONTENT DATA

BACKGROUND OF THE INVENTION

1. Field of the Invention

The present invention relates to a data terminal device that allows protection on copyrights with respect to obtained content data, particularly to a data terminal device that provides backup of content data inhibited of duplication in a recording medium. Furthermore, the present invention relates to a data terminal device that transfers obtained content data to another apparatus via a recording medium.

2. Description of the Background Art

By virtue of the progress in information communication networks and the like such as the Internet in these few years, each user can now easily access network information through individual-oriented terminals employing a cellular phone or the like.

By the recent incorporation of Java® into cellular phones, it is now possible to store various content data, image data for example, received from a server in the built-in memory of the cellular phone and provide the data on the display of the cellular phone. Also, game software can be received from a server at a cellular phone and stored in the built-in memory to be used to play that game through the cellar phone.

From the standpoint of copyright protection, the user cannot record such software stored in the built-in memory of a cellular phone to an external recording medium or transmit the same to another cellular phone. When the received software is no longer necessary, the user had to delete the software stored in the built-in memory from his/her cellular phone.

Even if the user wishes to store that software for later usage, that software had to be deleted if any new software is to be downloaded due to the limited size of the built-in memory of the cellular phone. The user has to receive the same deleted software from the server again to use that software afterwards.

Also, consider the case where the user changes his/her cellular phone. Since the software in the previously-used cellular phone cannot be transferred to the new cellular phone, the user must receive the same software from the server into the new cellular phone in order to use the same software in the new cellular phone.

This means that the user must pay again the fee required to receive the same software from the server. This is disadvantageous to the user.

There is also a problem that, in the case where a user wishes to give away a certain software program resident in his/her cellular phone to another user, the software could not be presented to the other user.

SUMMARY OF THE INVENTION

In view of the foregoing, an object of the present invention is to provide a data terminal device that facilitates distribution of obtained content data that must be deleted when transmitting to another apparatus while protecting the copyright.

According to an aspect of the present invention, a data terminal device generates encrypted content data that is an encrypted version of content data obtained in plaintext, and a license key required to decrypt encrypted content data, and transferring the encrypted content data and license key with respect to a data recording apparatus. The data terminal device includes an operation unit to input a designation, an interface to transfer data with a data recording apparatus, a storage unit storing content data in plaintext, an encrypted content generation unit generating a license key and encrypting content data using the generated license key to generate encrypted content data, a license generation unit generating a license including a license key and control information restricting the number of times of output of the license key from the data recording apparatus to once, an encryption/decryption processing unit encrypting a license generated by the license generation unit to generate an encrypted license, or receiving and decrypting another encrypted license including another license key stored in the data recording apparatus, a content data decryption unit receiving another encrypted content data stored in the data recording apparatus, and decrypting the received another encrypted content data using another license key decrypted and extracted by the encryption/decryption processing unit, and a control unit. The control unit responds to a transmission request of content data to a data recording apparatus input via the operation unit to read content data in plaintext from the storage unit and provide the same to the encrypted content generation unit, and transmits the encrypted content data and encrypted license to a data recording apparatus via the interface, and deletes the content data in plaintext stored in the storage unit.

In the data terminal device of the present invention, a license key is generated when content data is to be transmitted to the data recording device. Encrypted content data encrypted by the generated license key is transmitted to the data recording apparatus. The data terminal device also transmits to the data recording apparatus a license that allows only one output of the license recorded in the data recording apparatus when encrypted content data is received from the data recording apparatus. Then, the data terminal device deletes the content data stored in the storage unit. In other words, when content data is output to an external source, the former content data stored in the output source is substantially deleted. In the present invention, "substantially deleted" includes the concept of inhibiting a second output of a license key from the data recording apparatus by setting the usage number of times to "0", and otherwise. According to the present invention, content data can be distributed while preventing copying of the content data.

Preferably, the encryption/decryption processing unit includes an encryptor encrypting a license using a first session key applied from a data recording apparatus via the interface to generate an encrypted license. In the writing operation of the encrypted license to a data recording apparatus, the control unit receives the first session key from the data recording apparatus via the interface, and applies the received first session key to the encryptor.

The license is encrypted using the first session key generated at the data recording apparatus to be transmitted to the data recording apparatus. By virtue of the present invention, data is less vulnerable to leakage when content data is transmitted to a data recording apparatus.

Preferably, the encryption/decryption processing unit further includes a session key generator generating a session key to identify communication with a data recording apparatus, and a decryptor decrypting the encrypted data using a second session key generated by the session key generator. When an encrypted license is written into a data recording apparatus, the session key generator generates a second session key. The control unit provides the second session key to a data recording apparatus via the interface. The control unit receives from the data recording apparatus a first session key encrypted with the second session key via the interface, and applies the first session key encrypted using the received second session key to the decryptor.

In the transmission of content data to a data recording apparatus, a session key is transferred with respect to the data recording apparatus. The data terminal device receives from the data recording apparatus a first session key generated at the data recording apparatus and that is encrypted with its own generated second session key. According to the present invention, the data terminal device can transmit content data to a data recording apparatus while conducting mutual authentication during the transmission.

Preferably, the encryption/decryption processing unit further includes another encryptor that encrypts data using a first public key received from and unique to the data recording apparatus. When the encrypted license is written into the data recording apparatus, the decryptor uses the second session key to decrypt the first session key encrypted by the second session key and the first public key, and extracts the first session key and the first public key. The another encryptor encrypts the license generated by the license generation unit using the first public key. The encryptor receives the output of the another encryptor to apply encryption using the first session key, and generates an encrypted license encrypted using the first session key. The control unit provides the second session key to the data recording apparatus via the interface, and receives the first session key encrypted with the second session key from the data recording apparatus via the interface, and provides the received first session key encrypted by the second session key and the first public key to the decryptor.

When a license is to be transmitted to a data recording apparatus, the license is sequentially encrypted with the first public key held in the data recording apparatus and the session key generated at the data recording apparatus. By virtue of the present invention, license required to decrypt encrypted content data can be transmitted to a data recording apparatus under sufficient protection.

Preferably, the encryption/decryption processing unit further includes another encryptor encrypting data using a second public key. When an encrypted license is to be written into a data recording apparatus, the another encryptor encrypts the second session key using the second public key. The control unit receives authentication data including the second public key from the data recording apparatus via the interface. When determination is made that the received authentication data is proper, the control unit provides the second public key included in the received authentication data to the another encryptor, and provides the second session key encrypted with the second public key in the another encryptor to the data recording apparatus via the interface.

In the transmission of its own generated session key to a data recording apparatus, the data terminal device performs authentication of the authentication data from the data recording apparatus, and then encrypts its own generated session key using the second public key included in the authentication data to transmit the encrypted session key to the data recording apparatus. According to the present invention, data transmission to an illegal party can be prevented.

Preferably, the encryption/decryption processing unit includes a session key generator generating a session key to identify communication with a data recording apparatus, and a decryptor decrypting encrypted data using a session key generated by the session key generator. When another encrypted license is to be read out from the data recording apparatus, the session key generator generates a second session key. The control unit provides the session key generated by the session key generator to the data recording apparatus via the interface, receives from the data recording apparatus another encrypted license that is encrypted by the session key via the interface, and provides the received another encrypted license to the decryptor.

When content data is to be received from a data recording apparatus, the data terminal device sends/receives a session key to/from the data recording apparatus, and receives a license key that is encrypted with its own generated session key from the data recording apparatus. According to the present invention, the data terminal device can receive content data from a data recording apparatus while conducting mutual authentication during the reception process.

Preferably, the data terminal device further includes an authentication data hold unit storing authentication data to be applied to a data recording apparatus in response to a reception request input via the operation unit. The control unit provides the authentication data to the data recording apparatus via the interface, and receives another encrypted content data and another encrypted license from the data recording apparatus when authentication data is attested at the data recording apparatus.

When content data is transmitted to the data terminal device from a data recording apparatus, the authentication data of the data terminal device is applied to the data recording apparatus. Upon authentication of the authentication data at the data recording apparatus, another encrypted content data and another encrypted license are transmitted from the data recording apparatus to the data terminal device. According to the present invention, output of encrypted content data and encrypted license to an improper data terminal device can be prevented.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 shows the characteristics of data, information and the like for communication in the communication system of FIG. 1.

FIG. 3 shows the characteristics of data, information and the like for communication in the data distribution system of FIG. 1.

DESCRIPTION OF THE PREFERRED EMBODIMENTS

Figure 1:
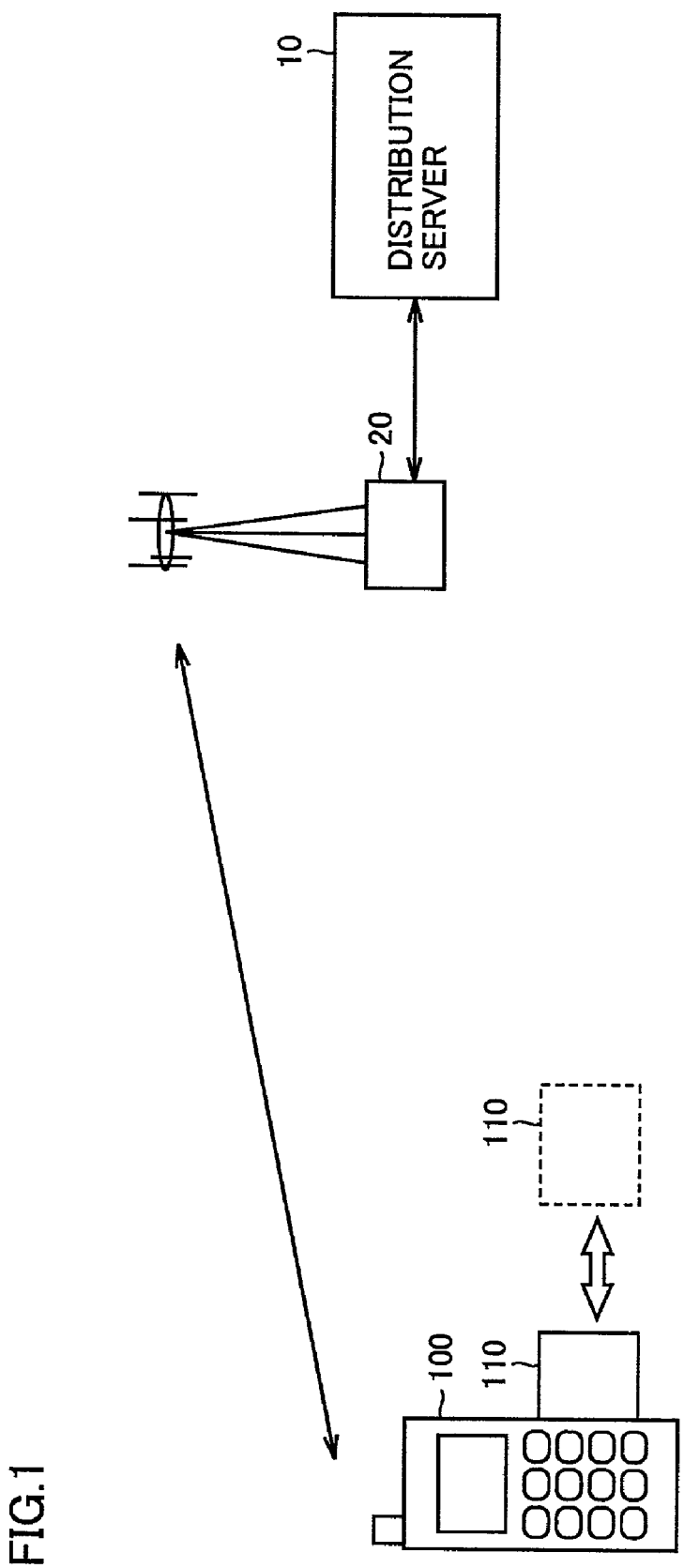
FIG. 1 is a schematic diagram to describe a communication system.

An embodiment of the present invention will be described in detail hereinafter with reference to the drawings. In the drawings, the same or corresponding components have the same reference characters allotted, and description thereof will not be repeated.

FIG. 1 is a schematic diagram to describe the entire structure of a communication system in which a data terminal device (cellular phone) obtains content data according to the present invention.

Content data refers to all data temporarily stored in the built-in memory of a data terminal device for usage such as image data (including motion picture data), audio data, and game programs. A program is taken as an example of content data hereinafter.

Referring to FIG. 1, a distribution server 10 receives via a carrier 20 a program distribution request transmitted from a user through his/her own cellular phone 100. Distribution server 10 responds to the received program distribution request to transmit a program to cellular phone 100 via carrier 20. In this case, distribution server 10 transmits a program in plaintext to cellular phone 100. Carrier 20 transmits the program distribution request from cellular phone 100 to distribution server 10, and transmits the program from distribution server 10 to cellular phone 100 through a cellular phone network.

Cellular phone 100 receives the program via the cellular phone network, and stores the received program in the built-in memory (not shown). An audible signal such as a melody is sounded at cellular phone 100 to notify incoming data. The user of cellular phone 100 executes the received program to provide various image data on the display of his/her cellular phone 100, or play a game according to the program through the display. In the case where the user wishes to store the program residing in the memory of cellular phone 100 to his/her own memory card 110, the user attaches memory card 110 to cellular phone 100, and designates cellular phone 100 to store the program into memory card 110.

When the program residing in the built-in memory is to be stored into memory card 110, cellular phone 100 generates a license key that is to be used to encrypt the program, as will be described afterwards. The program stored in the built-in memory is encrypted with the generated license key. The encrypted program is stored into memory card 110 together with a license that includes the generated license key and usage control information (usage rules) that restricts the usage of the license key to one time. After the encrypted program and license are stored in memory card 110, cellular phone 100 deletes the program from its built-in memory.

Thus, cellular phone 100 stores the program received from distribution server 10 into its built-in memory to execute the stored program. When the program is stored into memory card 110 in response to a user's command, cellular phone 100 deletes the stored program from the built-in memory. Therefore, the program will not be left stored in both cellular phone 100 and memory card 110. If the program is output from memory card 110, the program can no longer be output from memory card 110 thereafter. In other words, when the program is stored into memory card 110, cellular phone 100 attaches the usage control information restricting the usage of the license key to once in the transferred data. Therefore, the allowable number of times to output the license key from memory card 110 is restricted to once. When the program is output from memory card 110, i.e. when the encrypted program and license key are output, the number of times allowing output of the license key stored in memory card 110 is set to 0, i.e. reset to inhibit output of the license key. Therefore, the license key cannot be output from memory card 110 thereafter. This means that the program cannot be extracted from memory card 110 in a usable state. In the case where the program is output to cellular phone 100, the event of the program being stored in both cellular phone 100 and memory card 110 in a usable state will not occur. The program is always stored at only one site.

Memory card 110 is detachable with respect to cellular phone 100, and the user of cellular phone 100 can store an appropriate program into memory card 110. Even if the user changes his/her cellular phone to another cellular phone, the user can execute the program at his/her another cellular phone by attaching memory card 110 with the appropriate program to his/her another cellar phone and read out the program from memory card 110 into the another cellular phone.

Also, the user of cellular phone 100 can store the program residing in the built-in memory into memory card 100, and present that memory card 110 to another user. Then, the program stored in memory card 110 (actually an encrypted program and a license key that can be output) can be stored in the built-in memory of a cellular phone of another user.

FIG. 2 shows the characteristics of data, information and the like for communication used between distribution server 10 and cellular phone 100, or between cellular phone 100 and memory card 110, in the communication system of FIG. 1.

First, the data distributed by distribution server 10 will be described. Dc represents content data formed of a program. Content data Dc is transmitted in plaintext from distribution sever 10 to cellular phone 100 via carrier 20. The transmitted content data is stored in a data terminal device (cellular phone) or in a memory card.

The license in the present communication system includes a license key Kc required to decrypt encrypted content data. License key Kc is generated at cellular phone 100 when the program stored in cellular phone 100 is to be transmitted to memory card 110. License key Kc is transferred between cellular phone 100 and memory card 110 together with encrypted content data {Dc}Kc encrypted using license key Kc. The representation of {Y}X implies that data Y has been encrypted in a form decryptable by a decryption key X.

The license in the present communication system also includes access restrict information ACm that is the information to restrict access of the license in a recording apparatus (memory card). Specifically, access restrict information ACm is the control information when license key Kc is to be output to an external source from a memory card, and includes the reproducible number of times (the number of times the license key can be output for reproduction).

The license also includes a license ID functioning as an administration code to identify a license generated when encrypted content data {Dc}Kc is to be transmitted from cellular phone 100 to memory card 110.

License key Kc, access restrict information ACm, and license ID are collectively referred to as "license" hereinafter.

For the sake of simplification, it is assumed that access restrict information ACm restricts only the usage number of times restricting the output counts of the license key (0: usage disabled, 1: output allowed only once, set the output count of license key to 0).

FIG. 3 is a diagram to describe the characteristics of data, information and the like for authentication used in transferring a program between cellular phone 100 and memory card 110 in the communication system of FIG. 1.

A data terminal device (cellular phone) and a memory card are respectively assigned unique public encryption keys KPpy and KPmw. Public encryption keys KPpy and KPmw are decryptable using a secret decryption key Kpy unique to the data terminal device and a secret decryption key Kmw unique to the memory card, respectively. These public encryption keys and secret decryption keys have values differing for every type of data terminal device and memory card. These public encryption keys and secret decryption keys are generically referred to as "class key". These public encryption keys are called "class public encryption key", and these secret decryption keys are called "class secret decryption key". The unit sharing a class key is called "class". This class differs depending upon the manufacturer, the type of product, the lot in fabrication, and the like.

Cpy is provided as the class certificate of a data terminal device (cellular phone). Cmw is provided as the class certificate of a memory card. These class certificates include information differing for each class of data terminal devices and memory cards. Any class that has the tamper resistant module broken or encryption by a class key cracked, i.e. any class having an infringed secret decryption key, will become the subject of license revocation. The class public encryption key and class certificate of a data terminal device are recorded in respected data terminal devices and memory cards at the time of shipment in the form of authentication data {KPpy//Cpy}KPa for data terminal devices and in the form of authentication data {KPmw//Cmw}KPa for memory cards. KPa is a public authentication key common to the entire distribution system.

The key to administer data processing in memory card 110 includes a public encryption key KPmcx set for every memory card medium, and a unique secret decryption key Kmcx required to decrypt data encrypted with public encryption key KPmcx. The public encryption key and secret decryption key unique for each memory card are generically called "unique keys". Public encryption key KPmcx is called a "unique public encryption key". Secret decryption key Kmcx is called a "unique secret decryption key".

As an encryption key to maintain secrecy in data transfer between a memory card and a source external to the memory card, common keys Ks1–Ks4 are used. Common keys Ks1–Ks4 are generated at cellular phone 100 and memory card 110 every time content data is to be transferred between a data terminal device (cellular phone) and a memory card.

Here, common keys Ks1–Ks4 are unique common keys generated for every "session" between a data terminal device and a memory card corresponding to a communication or access basis. These common keys Ks1–Ks4 are also called "session keys" hereinafter.

Session keys Ks1–Ks4 are under control of a data terminal device and memory card by having a unique value for every session. Specifically, session key Ks1 is generated by a data terminal device (cellular phone) at every storage of a program into a memory card. Session key Ks2 is generated by a memory card at every storage of a program into a memory card. Session key Ks3 is generated by a memory card for every storage of a program into a cellular phone. Session key Ks4 is generated by a cellular phone for every storage of a program into a cellular phone. At each session, these session keys are transmitted/received. Upon receiving a session key generated by the apparatus of the other party, the content data, a license key, and the like are transmitted in an encrypted form with the received session key. Thus, the security in the section can be improved.

Figure 4:
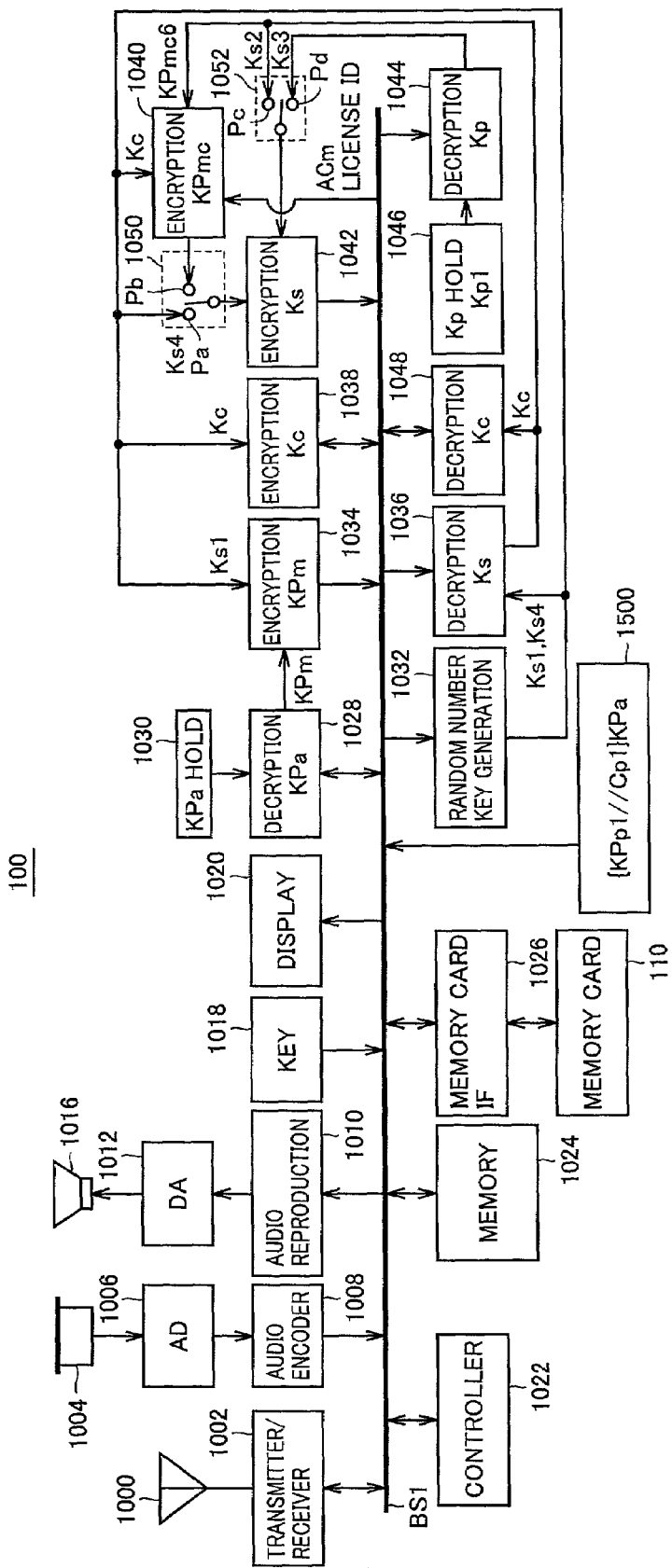
FIG. 4 is a schematic block diagram of a structure of a cellular phone in the communication system of FIG. 1.

FIG. 4 is a schematic block diagram to describe a structure of cellular phone 100 of FIG. 1.

Cellular phone 100 includes an antenna 1000, a transmitter/receiver unit 1002, a microphone 1004, an AD converter 1006, an audio encoder 1008, an audio reproduction unit 1010, a DA converter 1012, a speaker 1016, a key operation unit 1018, a display 1020, a controller 1022, a memory 1024, a memory card interface 1026, decryption processing units 1028, 1036, 1044 and 1048, an authentication key hold unit 1030, a random key generation unit 1032, encryption processing units 1034, 1038, 1040 and 1042, a Kp hold unit 1046, switches 1050 and 1052, and an authentication data hold unit 1500.

Antenna 1000 receives a signal transmitted through radio by a cellular phone network. Transmitter/receiver unit 1002 receives a signal from antenna 1000 to convert the signal into a baseband signal, or modulates data from cellular phone 100 to provide the modulated data to antenna 1000. Data is transferred among respective components in cellular phone 100 through a bus BS1. A microphone 1004 inputs audio data of the user of cellular phone 100. The audio data is output to an AD converter 1006. AD converter 1006 converts the audio data into a digital signal from an analog signal. Audio encoder 1008 encodes the audio signal converted into a digital signal according to a predetermined system. Audio reproduction unit 1010 decodes the audio signal received from another cellular phone. DA converter 1012 converts the audio signal from audio reproduction unit 1010 into an analog signal from a digital signal to output audio data. The audio data is output through speaker 1016.

Key operation unit 1018 provides an external command to cellular phone 100. Display 1020 provides the information output from controller 1022 or the like as visual information. Controller 1022 controls the operation of cellular phone 100 via bus BS1. A memory 1024 stores a program from distribution server 10 as the received content data. Memory card interface 1026 controls the data transfer between memory card 110 and bus BS1.

In the session of recording a program from cellular phone 100 into memory card 110 (also called "store"), decryption processing unit 1028 decrypts the authentication data receives from memory card 110 using public authentication key KPa from authentication key hold unit 1030. Authentication key hold unit 1030 stores a public authentication key Kpa. Random number key generation unit 1032 generates session keys Ks1, Ks4 and a license key Kc in the operation of storing a program into memory card 110, or in the session of recording a program from memory card 110 into cellular phone 100 (also called "restore").

Encryption processing unit 1034 encrypts session key Ks1 generated by random number key generation unit 1032 using public encryption key KPmw obtained by decryption at decryption processing unit 1028, and provides the encrypted result onto bus BS1 in the operation of storing a program. In the program storing operation, decryption processing unit 1036 receives via bus BS1 encrypted data from memory card 110 that is encrypted with session key Ks1, and decrypts the received encrypted data using session key Ks1.

Encryption processing unit 1038 receives the content data stored in memory 1024 via bus BS1, and encrypts the received content data Dc using license key Kc generated by random number key generation unit 1032. The encrypted content data {Dc}Kc is output onto bus BS1. In a program storing operation, encryption processing unit 1040 encrypts license key Kc generated by random number key generation unit 1032, a license ID that is the administration code to identify a license, and access restrict information ACm using public encryption key KPmcw. The encrypted data {license ID//Kc//ACm}Kmcw is output to a terminal Pb of switch 1050.

In a program storing operation, encryption processing unit 1042 uses session key Ks2 to encrypt encrypted data {license ID//Kc//ACm}Kmcw obtained by sequentially switching terminals Pa and Pb of switch 1050. Encrypted data {{license ID//Kc//ACm}Kmcw}Ks2 is output onto bus BS1.

In a program restore operation, decryption processing unit 1044 receives via bus BS1 encrypted data that is encrypted with public encryption key KPp from memory card 110, and decrypts the received encrypted data using secret decryption key Kp. Kp hold unit 1046 stores secret decryption key Kp unique to the class. In a program restore operation, decryption processing unit 1048 receives via bus BS1 encrypted content data {Dc}Kc from memory card 110, and decrypts the received encrypted content data {Dc}Kc using license key Kc generated by random number key generation unit 1032. The content data is output onto bus BS1. Authentication data hold unit 1500 stores authentication data {KPp1//Cp1}KPa encrypted in a form that can have its validity authenticated by decrypting class public encryption key KPp1 and class certificate Cp1 using public authentication key KPa. Here, it is assumed that class y of cellular phone 100 is y=1.

The operation of each structural component of cellular phone 100 in respective sessions will be described in detail afterwards based on flow charts.

Figure 5:
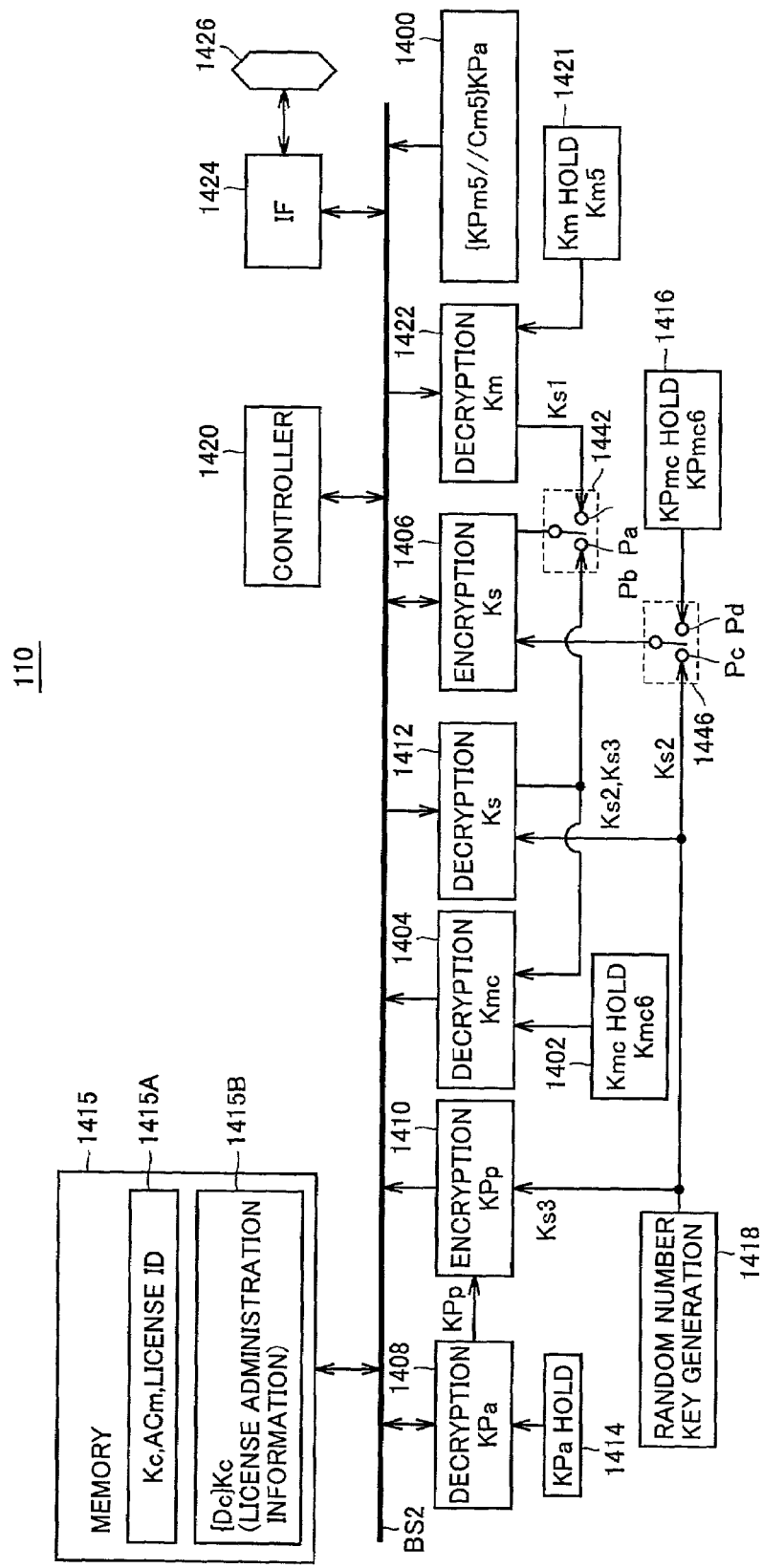
FIG. 5 is a schematic block diagram of a structure of a memory card in the communication system of FIG. 1.

FIG. 5 is a schematic block diagram of a structure of memory card 110 of FIG. 1. Referring to FIG. 5, memory card 110 includes an authentication data hold unit 1400, a Kmc hold unit 1402, decryption processing units 1404, 1408, 1412, and 1422, encryption processing units 1406 and 1410, an authentication key hold unit 1414, a memory 1415, a KPmc hold unit 1416, a random number key generation unit 1418, a controller 1420, a Km hold unit 1421, an interface 1424, a terminal 1426, and switches 1442 and 1446.

As mentioned before, KPmw and Kmw are provided as the class public encryption key and class secret decryption key of a memory card, respectively. Also, a class certificate Cmw of the memory card is provided. It is assumed that natural number w is w=5 in memory card 110. Also, it is assumed that the natural number x to identify a memory card is represented as x=6.

Therefore, authentication data hold unit 1400 stores authentication data {KPm5//Cm5}KPa. Data is transferred among respective structural components of memory card 110 via a bus BS2. Kmc hold unit 1402 stores a unique secret decryption key Kmc6 that is a unique decryption key set for every memory card. Decryption processing unit 1404 decrypts the data on bus BS2 using unique secret decryption key Kmc6 of memory card 110 that is a companion to unique public encryption key KPmc6.

Encryption processing unit 1406 encrypts data selectively applied by switch 1446 using a key selectively applied by switch 1442. The encrypted data is output onto bus BS2. Decryption processing unit 1408 receives public authentication key KPa from authentication key hold unit 1414 to decrypt the data applied from bus BS2 using public authentication key KPa, and provides the decrypted result and obtained class certificate to controller 1420, and the obtained class public key to encryption processing unit 1410. Encryption processing unit 1410 encrypts session key Ks3 output from random number key generation unit 1418 using class public encryption key KPpy obtained by decryption processing unit 1408. The encrypted key is output onto bus BS2.

Decryption processing unit 1412 receives from bus BS2 data encrypted with session key Ks2, and decrypts the received data using session key Ks2 generated by random number key generation unit 1418. Authentication key hold unit 1414 stores public authentication key KPa. KPmc hold unit 1416 stores public encryption key KPmc6 that can be decrypted using unique secret decryption key Kmc6. In the session of program storing or program restoring, random key generation unit 1418 generates session keys Ks2 and Ks3.

Memory 1415 receives and stores via bus BS2 encrypted content data {Dc}Kc, and a license (Kc, ACm, license ID) required to decode encrypted content data for usage. Memory 1415 is formed of, for example, a semiconductor memory. Memory 1415 includes a license region 1415A and a data region 1415B. License region 1415A is a region where the license is to be recorded. Data region 1415B is a region to store encrypted content data {Dc}Kc, a license administration file recording the license administration information required for license administration for every encrypted content, and a list file storing basic information required to access the encrypted content data and license stored in the memory card. Data region 1415B can be directly accessed from an external source. The details of the license administration file and list file will be described afterwards.

In license region 1415A are stored licenses in the recording unit exclusive to the license, called entries, to have the license (license key Kc, access restrict information ACm, and license ID) recorded. When access is effected with respect to a license, the entry where the license is to be stored or where a license is to be recorded is specified through an entry number.

The entire structure except for data region 1415 is formed of a tamper resistant module region.

Controller 1420 transfers data to/from an external source via bus BS2, and receives various information through bus BS2 to control the operation of memory card 110. Km hold unit 1421 stores a class secret decryption key Km5. Interface 1424 transmits/receives a signal to/from memory interface 1026 via a terminal 1426. Decryption processing unit 1422 decrypts the data applied onto bus BS2 from interface 1424 using class secret decryption key Km5 from Km hold unit 1421, and provides session key Ks1 generated when cellular phone 100 stores a program to a contact Pa.

By providing a secret key for a recording apparatus that is a memory card, administration of content data transferred from cellular phone 100 as well as the encrypted license key can be effected on a memory card basis.

The operation of each session in the communication system of FIG. 1 will be described hereinafter.

Program Storing

The operation of the recording encrypted content data and a license from cellular phone 100 into memory card 110 in the communication system of FIG. 1 will be described hereinafter. This operation is also called "store".

Figure 6:
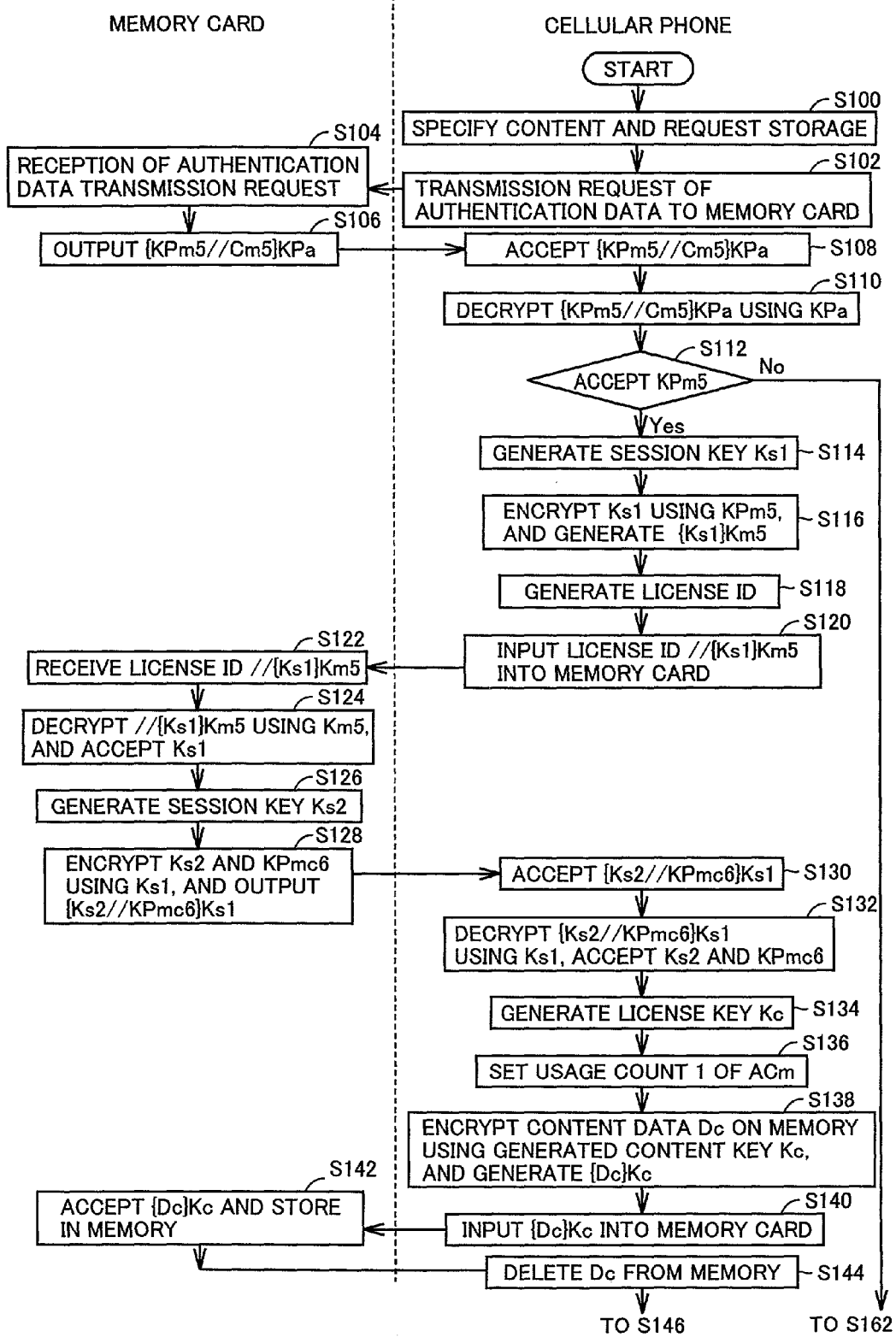
FIGS. 6 and 7 are first and second flow charts, respectively, to describe storage of content data to a memory card from a cellular phone in the communication system of FIG. 1.
Figure 7:
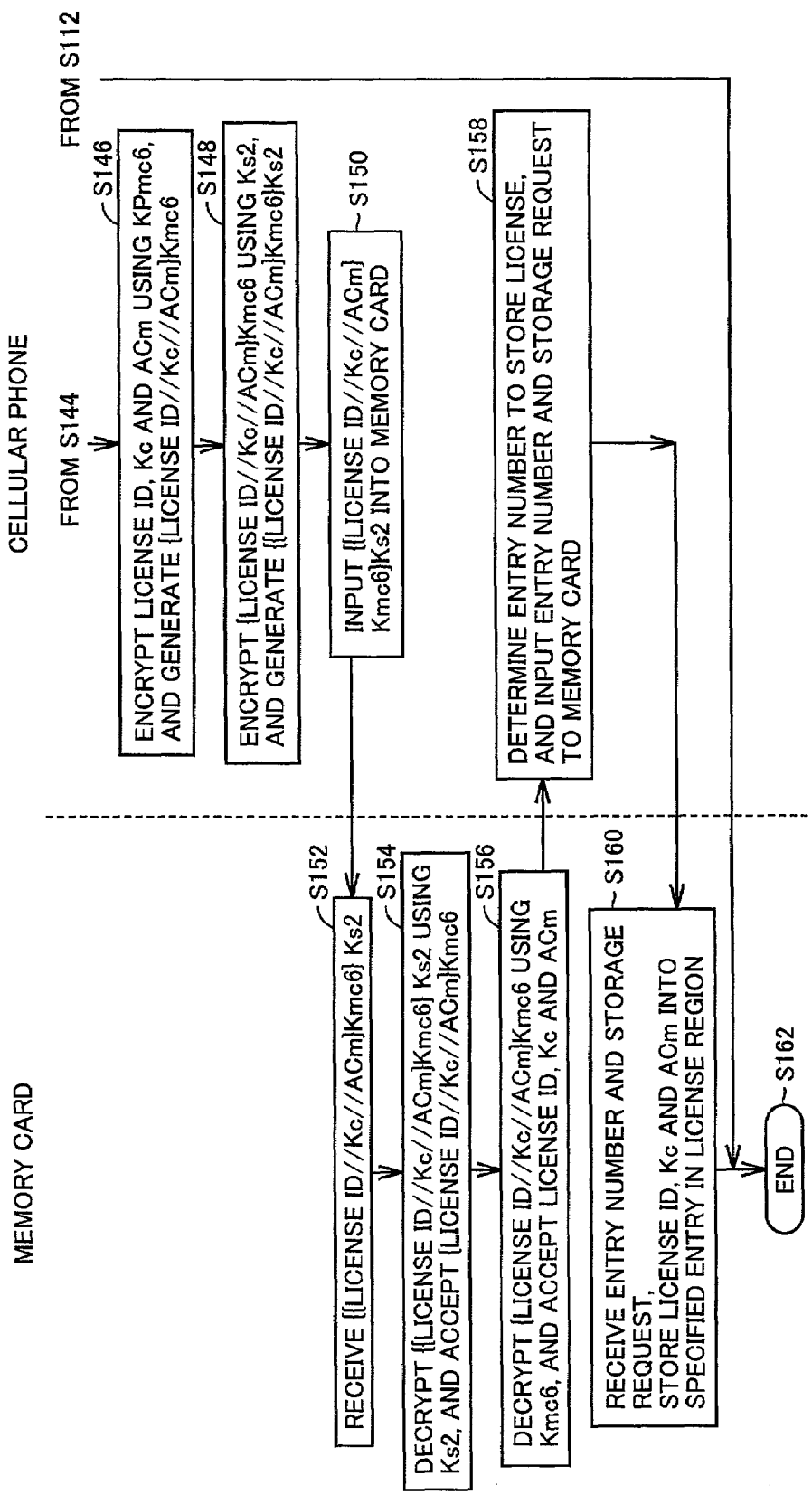

FIGS. 6 and 7 are flow charts to describe the operation of storing a program from cellular phone 100 into memory card 110 in the communication system of FIG. 1.

Referring to the first flow chart of FIG. 6, the user of cellular phone 100 enters a request of storing specified content data via key operation unit 1018 (step S100).

In response to an input of a content data store request, controller 1022 sends an authentication data transmission request to memory card 110 via bus BS1 and memory card interface 1026 (step S102). Controller 1420 of memory card 110 receives the authentication data transmission request via terminal 1426, interface 1424 and bus BS2 (step S104). Controller 1420 reads out authentication data {KPm5//Cm5}KPa from authentication data hold unit 1400 via bus BS2, and outputs authentication data {KPm5//Cm5}KPa via bus BS2, interface 1424 and terminal 1426 (step S106).

Controller 1022 of cellular phone 100 receives authentication data {KPm5//Cm5}KPa from memory card 110 via memory card interface 1026 and bus BS1 (step S108). The received authentication data {KPm5//Cm5}KPa is applied to decryption processing unit 1028. Decryption processing unit 1028 decrypts authentication data {KPm5//Cm5}KPa using public authentication key KPa from authentication key hold unit 1030 (step S110). Controller 1022 carries out an authentication process of determining reception of authentication data subjected to encryption to verify the validity thereof with a proper apparatus from the decrypted processing result of decryption processing unit 1028 (step S112). When determination is made of proper authentication data, controller 1022 authorizes and accepts class public encryption key KPm5 and class certificate Cm5. Then, control proceeds to the next process (step S114). When the authentication data is not proper, an unauthorized state is identified, and the store operation ends without accepting class public encryption key KPm5 and class certificate Cm5 (step S162).

When authentication is performed and confirmation is made that memory card 110 into which the program is to be stored has the proper authentication data, random number key generation unit 1032 generates a session key Ks1 to store the program (step S114). Encryption processing unit 1034 encrypts session key Ks1 from random number key generation unit 1032 using public encryption key KPm5 from decryption processing unit 1028. Encrypted data {Ks1}Km5 is output onto bus BS1. Controller 1022 generates a license ID (step S118), and transmits the generated license ID and encrypted data {Ks1}Km5 from encryption processing unit 1034 as a license ID//{Ks1}Km5 to memory card 110 via bus BS1 and memory card interface 1026 (step S120).

Controller 1420 of memory card 110 receives license ID//{Ks1}Km5 via terminal 1426, interface 1424 and bus BS2 (step S122). The received encrypted data {Ks1}Km5 is applied to decryption processing unit 1422 via bus BS2. Decryption processing unit 1422 decrypts encrypted data {Ks1}Km5 using secret decryption key Km5 from Km hold unit 1421, and accepts session key Ks1 generated at cellular phone 100 (step S124).

Under control of controller 1420, random number key generation unit 1418 generates a session key Ks2 (step S126). Encryption processing unit 1406 encrypts session key Ks2 and public encryption key KPmc6 received by the sequential switching of contacts Pc and Pd of switch 1446 using session key Ks1 received via contact Pa of switch 1442. Encrypted data {Ks2//KPmc6}Ks1 is output onto bus BS2. Controller 1420 transmits encrypted data {Ks2//KPmc6}Ks1 to cellular phone 100 via bus BS2, interface 1424 and terminal 1426 (step S128).

Controller 1022 of cellular phone 100 receives encrypted data {Ks2//KPmc6}Ks1 via memory card interface 1026 and bus BS1 (step S130). The received encrypted data {Ks2//KPmc6}Ks1 is applied to decryption processing unit 1036 via bus BS1. Decryption processing unit 1036 decrypts encrypted data {Ks2//KPmc6}Ks1 using session key Ks1 generated by random number key generation unit 1032, and accepts session key Ks2 and public encryption key KPmc6 (step S132).

Upon confirming reception of session key Ks2 generated at memory card 110 and public encryption key KPmc6 unique to memory card 110, controller 1022 controls random number key generation unit 1032 so as to generate license key Kc. Random number key generation unit 1032 generates a license key (step S134). Then, controller 1022 sets access restrict information ACm having the usage number restricted to "1" (step S136). Controller 1022 reads out content data Dc from memory 1024 via bus BS1. The read out content data Dc is applied to encryption processing unit 1038 via bus BS1. Encryption processing unit 1038 encrypts content data Dc received via bus BS1 using a license key Kc from random number key generation unit 1032. Encrypted content data {Dc}Kc is output onto bus BS1 (step S138). Controller 1022 transmits encrypted data {Dc}Kc on bus BS1 to memory card 110 via memory card interface 1026 (step S140).

Controller 1420 of memory card 110 receives encrypted content data {Dc}Kc via terminal 1426, interface 1424 and bus BS2. The received encrypted content data {Dc}Kc is stored in data region 1415B of memory 1415 via bus BS2 (step S142).

Then, controller 1022 of cellular phone 100 deletes the content data stored in memory 1024 via bus BS1 (step S144).

Referring to the flow chart of FIG. 7, controller 1022 provides a license ID and access restrict information ACm to encryption processing unit 1040 via bus BS1. Encryption processing unit 1040 uses public encryption key KPmc6 from decryption processing unit 1036 to encrypt the license ID and access restrict information ACm received via bus BS1 as well as license key Kc from random number key generation unit 1032. The encrypted data {license ID//Kc//ACm}Kmc6 is output to contact Pb of switch 1050 (step S146). Then, encryption processing unit 1042 encrypts encrypted data {license ID//Kc//ACm}Kmc6 received via contact Pb of switch 1050 using session key Ks2 received via contact Pc of switch 1052. Encrypted data {{license ID//Kc//ACm}Kmc6}Ks2 is provided to bus BS1 (step S148). Then, controller 1022 transmits encrypted data {{license ID//Kc//ACm}Kmc6}Ks2 on bus BS1 to memory card 110 via memory card interface 1026 (step S150).

Controller 1420 of memory card 110 receives encrypted data {{license ID//Kc//ACm}Kmc6}Ks2 via terminal 1426, interface 1424 and bus BS2 (step S152). Controller 1420 provides encrypted data {{license ID//Kc//ACm}Kmc6}Ks2 to decryption processing unit 1412 via bus BS2. Decryption processing unit 1412 decrypts encrypted data {{license ID//Kc//ACm}Kmc6}Ks2 using session key Ks2, and accepts encrypted data {{license ID//Kc//ACm}Kmc6 (step S154). Decryption processing unit 1404 uses secret decryption key Kmc6 from Kmc hold unit 1402 to decrypt encrypted data license ID//Kc//ACm}Kmc6 decrypted by decryption processing unit 1412, and accepts a license ID, a license key Kc, and access restrict information ACm (step S156).

Then, controller 1022 of cellular phone 100 determines the entry number to store a license. The determined entry number and a license store request are transmitted to memory card 110 via bus BS1 and memory card interface 1026 (step S158).

Controller 1420 of memory card 110 receives the entry number and storage request via terminal 1426, interface 1424 and bus BS2, and stores the license ID, license key Kc and access restrict information ACm into the designated entry in license region 1415A of memory 1415 (step S160). Then, the program store operation into memory card 110 ends (step S162).

Determination is made whether memory card 110 is a proper memory card or not at the time of storing a program corresponding to content data Dc received from distribution sever 10 and stored in memory 1024 of cellular phone 100. Content data Dc is transmitted to memory card 110 (refer to step S140 in FIG. 6) only upon confirmation of a proper memory card (step S112 of FIG. 6). Thus the program corresponding to content data Dc will not be stored into an improper memory card, and is protected sufficiently.

When the program is to be stored into memory card 110, content data Dc and the license (license key Kc, license ID and access restrict information ACm) are transmitted to memory card 110 in an encrypted form (refer to step S140 of FIG. 6, and steps S146, S148 and S150 of FIG. 7). The license is transmitted to memory card 110 as encrypted data that can be decrypted using public decryption key Kmc6 retained by the destination memory card. Since the program and license are transmitted to memory card 110 in an encrypted form, sufficient protection is established. Even if encrypted content data {Dc}Kc and the encrypted license are extracted from the destination memory card 110 by some cause, the encrypted license cannot be decrypted without secret decryption key Kmc6, so that the required license key Kc cannot be obtained. Thus, encrypted content data {Dc}Kc cannot be decrypted to obtain content data Dc.

After the encrypted data {Dc}Kc is transmitted to memory card 110, the former content data Dc stored in memory 1024 is deleted (refer to step S144 of FIG. 6). This means that content data Dc is stored only in memory card 110. The program cannot be copied for usage. Random number key generation unit 1032, encryption processing unit 1038 and decryption processing unit 1048 of cellular phone 100 are formed of volatile memories. License key Kc required to decrypt encrypted content data {Dc}Kc is stored only in memory card 110.

Program Restore

Recording content data Dc stored in memory card 110 into cellular phone 100 will be described with reference to FIG. 8. This operation is termed "restore". The description is based on the postulation that, prior to the process of FIG. 8, the user of cellular phone 100 has determined the content (program) to be obtained from memory card 110, identified the content file, and already obtained the license administration file, according to the list file recorded in data region 1415B of memory card 110.

In response to a restore request specifying the encrypted content data input via key operation unit 1018 by the user into cellular phone 100 (step S200), controller 1022 obtains authentication data {KPp1//Cp1}KPa from authentication data hold unit 1500 via bus BS1. Authentication data {KPp1//Cp1}KPa is transmitted to memory card 110 via memory card interface 1026 (step S202).

Controller 1420 of memory card 110 receives authentication data {KPp1//Cp1}KPa via terminal 1426, interface 1424 and bus BS2 (step S204). The received authentication data {KPp1//Cp1}KPa is applied to decryption processing unit 1408 via bus BS2. Authentication processing unit 1408 decrypts the received authentication data {KPp1//Cp1}KPa using public authentication key KPa from authentication key hold unit 1414 (step S206). Controller 1420 performs an authentication process from the decrypted processing result of decryption processing unit 1408. Specifically, an authentication process of determining whether authentication data {KPp1//Cp1}KPa is proper authentication data is conducted (step S208). If decryption is disabled, control proceeds to step S250, and the restore operation ends.

In the case where the authentication data can be decrypted, random number key generation unit 1418 of memory card 110 generates a session key Ks3 for the restore operation (step S210). Encryption processing unit 1410 provides session key Ks3 from random number key generation unit 1418 and {Ks3}Kp1 encrypted using public encryption key KPp1 decrypted at decryption processing unit 1408 onto bus BS2. Then, controller 1420 outputs {Ks3}Kp1 to memory card interface 1026 via interface 1424 and terminal 1426 (step S212). Controller 1022 of cellular phone 100 accepts {Ks3}Kp1 via memory card interface 1026 (step S214). Controller 1022 provides encrypted data {Ks3}Kp1 to decryption processing unit 1044. Decryption processing unit 1044 decrypts encrypted data {Ks3}Kp1 using secret decryption key Kp1 from Kp hold unit 1046, and accepts session key Ks3 (step S216). Decryption processing unit 1044 outputs session key Ks3 to contact Pd of switch 1052.

Then, random number key generation unit 1032 generates a session key Ks4 for a restore operation (step S218). Session key Ks4 is output to contact Pa of switch 1050. Encryption processing unit 1042 uses session key Ks3 received via contact Pd of switch 1052 to encrypt session key Ks4 received via contact Pa of switch 1050. Encrypted data {Ks4}Ks3 is output onto bus BS1 (step S220). Controller 1022 transmits encrypted data {Ks4}Ks3 on bus BS1 to memory card 110 via memory card interface 1026 (step S222).

Controller 1420 of memory card 110 receives encrypted data {Ks4}Ks3 via terminal 1426, interface 1424 and bus BS2 (step S224). The received encrypted data {Ks4}Ks3 is applied to decryption processing unit 1412 via bus BS2. Decryption processing unit 1412 decrypts encrypted data {Ks4}Ks3 using session key Ks3 from random number key generation unit 1418, and accepts session key Ks4 generated at cellular phone 100 (step S226).

In response, controller 1022 of cellular phone 100 transmits the entry number and the output request of encrypted content data {Dc}Kc to memory card 110 via memory card interface 1026 (step S228).

Controller 1420 of memory card 110 receives the entry number and the output request via terminal 1426, interface 1424 and bus BS2. The license ID, license key Kc and access restrict information ACm stored in the received entry are obtained via bus BS2 (step S230). Controller 1420 refers to the usage number of times in access restrict information ACm. If the usage number is set to "0", determination is made that usage is disabled, i.e. encrypted data {Dc}Kc cannot be output to cellular phone 100. Therefore, the restore operation ends (step S250). Controller 1420 determines that encrypted content data {Dc}Kc can be output to cellular phone 100 if the usage count is set to "1", and proceeds to the next step S234 (step S232). Since the usage count is set to "1" (step S136 of FIG. 6) when encrypted content data {Dc}Kc is transmitted to memory card 110, controller 1420 determines that license key Kc can be output to cellular phone 100 at step S232. Then, controller 1420 sets the usage count of access restrict information ACm to "0", i.e., sets to "usage disable" to disallow reproduction, and modifies access restrict information ACm in the entry (step S234). Accordingly, license key Kc cannot be output from memory card 110 thereafter.

Controller 1420 provides license key Kc to encryption processing unit 1406 via bus BS2. Encryption processing unit 1406 encrypts license key Kc using license key Ks4 received via contact Pb of switch 1442 to output encrypted data {Kc}Ks4 onto bus BS2. Controller 1420 transmits encrypted data {Kc}Ks4 on bus BS2 to cellular phone 100 via interface 1424 and terminal 1426 (step S236).

Controller 1022 of cellular phone 100 receives encrypted data {Kc}Ks4 via memory card interface 1026 and bus BS1 (step S238), and provides the accepted encrypted data {Kc}Ks4 to decryption processing unit 1036 via bus BS1. Decryption processing unit 1036 decrypts encrypted data {Kc}Ks4 using session key Ks4 from random number key generation unit 1032 to accept license key Kc (step S240). In response, controller 1022 transmits the output request of encrypted content data {Dc}Kc to memory card 110 via memory card interface 1026 (step S242).

Controller 1420 of memory card 110 receives the output request of encrypted content data {Dc}Kc via terminal 1426, interface 1424 and bus BS2 to obtain encrypted content data {Dc}Kc from data region 1415B in memory 1415 via bus BS2, and transmits encrypted content data {Dc}Kc to memory card 110 via interface 1424 and terminal 1426 (step S244).

Controller 1022 of cellular phone 100 receives encrypted content data {Dc}Kc via memory card interface 1026 (step S246), and provides the received encrypted content data {Dc}Kc to decryption processing unit 1048 via bus BS1. Decryption processing unit 1048 decrypts encrypted content data {Dc}Kc using license key Kc from decryption processing unit 1036 to obtain content data Dc. Controller 1022 transfers content data Dc to memory 1024 via bus BS1 (step S248). The entire operation ends (step S250).

Figure 8:
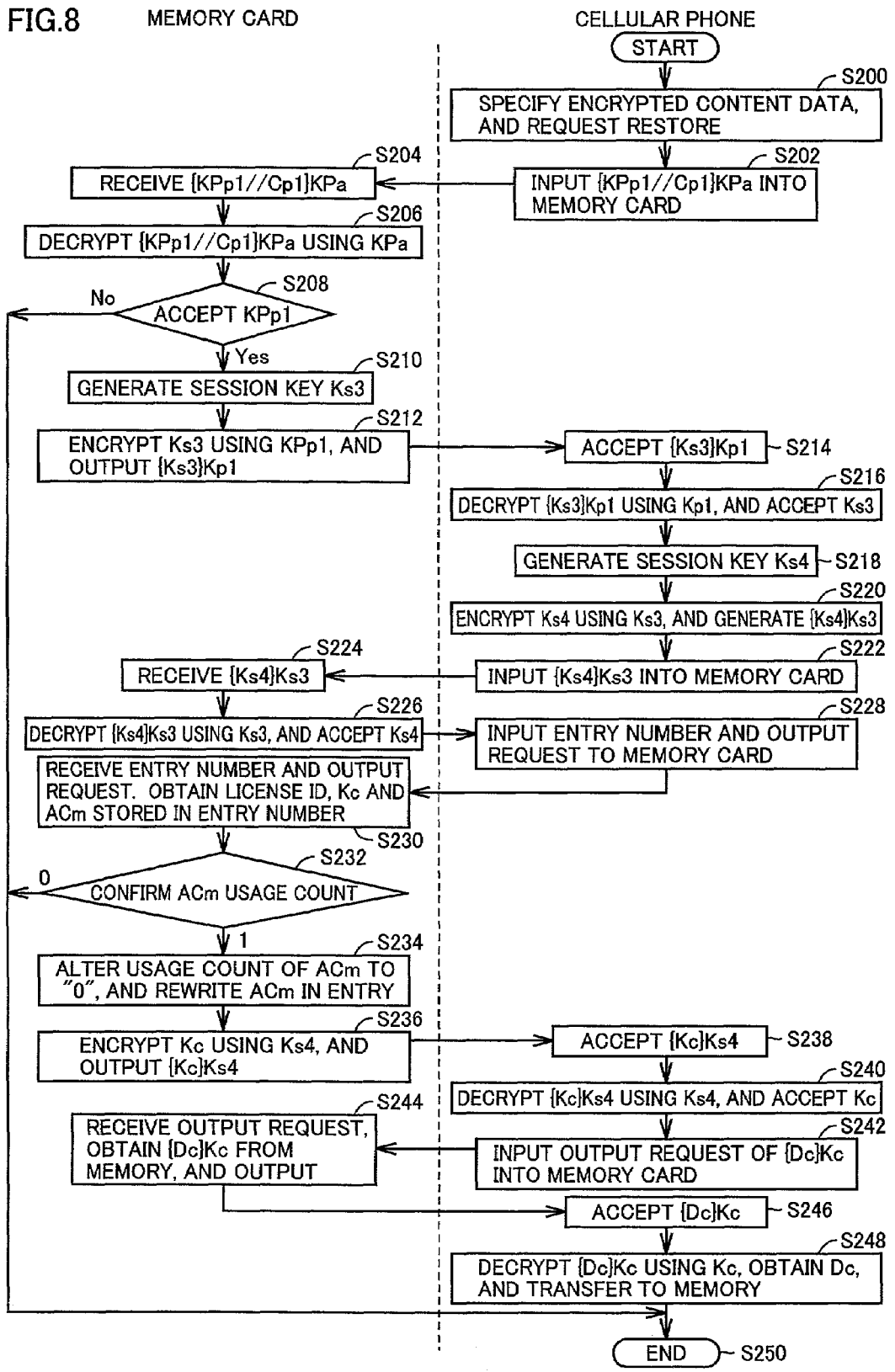
FIG. 8 is a flow chart to describe storage of content data from a memory card to a cellular phone in the communication system of FIG. 1.

When the program from cellular phone 100 stored in memory card 110 as content data Dc is output from memory card 110 and stored again into cellular phone 100, the usage count of the license of content data Dc is set to "0" (refer to step S234 of FIG. 8). Accordingly, the license cannot be output and encrypted content data {Dc}Kc can no longer be decrypted thereafter. This is substantially equivalent to deletion of content data from memory card 110.

Thus, when content data Dc is to be stored into memory card 110, encrypted content data {Dc}Kc with the usage count in the license set to "1" is stored in memory card 110. When content data Dc is to be output from memory card 110, the usage count in the license stored in memory card 110 is set to "0" simultaneous to output of the license, whereby usage is disallowed. Accordingly, license output if inhibited thereafter, and the content data Dc left in memory card 110 (specifically, encrypted content data {Dc}Kc and license) can no longer be used.

As a result, content data Dc that can be used is only the data stored in the built-in memory of cellular phone 100 in the restore operation of content data into the built-in memory of cellular phone 100.

Even if encrypted content data {Dc}Kc left in memory card 110 is copied, license key Kc required to decrypt the copied encrypted content data {Dc}Kc for usage cannot be read out from memory card 110. This means that the copied encrypted content data {Dc}Kc cannot be decrypted, and content data Dc cannot be used.

The present invention is characterized in that, when an apparatus (for example, memory card) storing content data Dc transmitted from another apparatus (for example, cellular phone) outputs the content data, content data Dc stored in its own region is deleted or inhibited of usage thereafter. By restricting the number of times of usage of content data Dc in the memory card and modifying the usage count determined by the restricted number of times to "0", license key Kc required for the usage of content data Dc is substantially deleted. This deletion method takes advantage of the fact that a memory card is used in an attached manner to an apparatus such as a cellular phone and content data Dc stored in the memory card must be output from the memory card for usage.

As to the output of content data Dc from the memory card, the manner of deleting content data Dc from the memory card, or the manner of being restricted equivalent to deletion is arbitrary in the present invention.

Although content data corresponding to a license having the usage count set to "0" is substantially equivalent to have being deleted, the license key and content key are still present in the memory card. In the case where there is a request to transfer entire content data from the cellular phone to the memory card, only the usage count is to be reset to "1" without having to transfer the entire content data. Therefore, the process for transferring is increased in speed.

Since a program can be stored from a cellular phone to a memory card, the user can execute the same program with his/her another cellular phone, when exchanged. The user does not have to receive the same program again from the distribution server even when the user changes his/her cellular phone to another one.

Furthermore, by storing a program from a cellular phone to a memory card, the usability of the user can be improved while inhibiting creating copies of the program.

Figure 9:
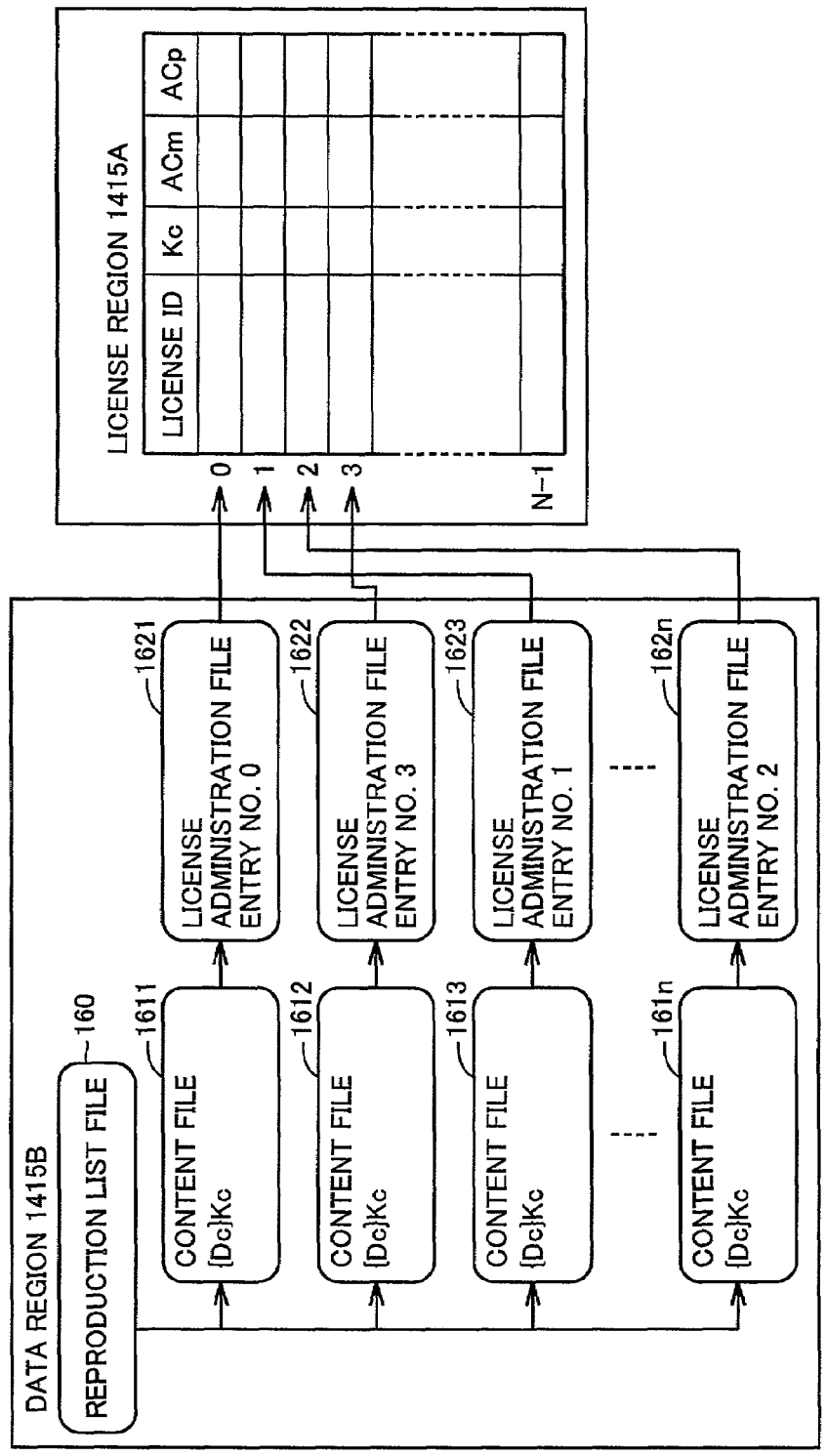
FIG. 9 is a diagram showing a license region and a data region in a memory of the memory card of FIG. 5.

FIG. 9 shows a license region 1415A and a data region 1415B in memory 1415 of memory card 110. In data region 1415B are stored a list file 160, content files 1611–161n, and license administration files 1621–162n. Content files 1611–161n in record received encrypted content data {Dc}Kc as one file. License administration files 1621–162n are recorded corresponding to content files 1611–161n, respectively.

Upon receiving encrypted content data and a license from cellular phone 100, memory card 110 records the encrypted content data and the license in memory 1415.

The license of the encrypted content data transmitted to memory card 110 is recorded in a region specified by the entry number in license region 1415A of memory 1415. The entry number can be obtained by reading out the license administration file of list file 160 recorded in data region 1415B in memory 1415. The corresponding license can be read out from license region 1415A according to the obtained entry number.

For example, entry number "0" can be obtained by reading out license administration file 1621 corresponding to content file 1611. The license of encrypted content data {Dc}Kc stored in content file 1611 can be obtained from the region specified by entry number "0" in license region 1415A. The same applies for a license recorded in a region specified by other entry numbers.

The above description is based on the case where a program is stored from a cellular phone to a memory card, and then restored. The present invention includes the case where a program is transmitted from a cellular phone to another cellular phone. In this case, the program stored in the built-in memory is to be deleted after transmission of the program to another cellular phone, similar to the above-described cellular phone 100.

According to the present embodiment, the cellular phone receiving a program from a distribution server deletes its stored program when the received program is to be recorded into a memory card. The memory card disables usage of its stored program when the program is to be stored to a cellular phone. Thus, a program can be transferred to another apparatus while creating a copy of the program is inhibited.

The content data of interest in the present invention includes, but not limited to, a program. All copyrighted works that can be reproduced through a data terminal are of interest. Although the above description is based on a communication system with a communication protocol between a cellular phone and a memory card, the communication capability between a cellular phone and a distribution server is not always necessary. Content data can be obtained from a distribution server through wire. Furthermore, the reproduction capability of content data is not always necessary.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data terminal device generating encrypted content data that is an encrypted version of content data obtained in plaintext, and a license key required to decrypt said encrypted content data, and transferring said encrypted content data and said license key between a data recording apparatus, said data terminal device comprising:

an operation unit to input a designation, an interface to transfer data with said data recording apparatus, a storage unit to store said content data in plaintext, an encrypted content generation unit generating said license key, and generating said encrypted content data by encrypting said content data using the generated license key, a license generation unit generating a license including said license key and control information restricting the number of times of output of said license key from said data recording apparatus to once, an encryption/decryption processing unit encrypting the license generated by said license generation unit to generate an encrypted license, or receiving and decrypting another encrypted license stored in said data recording apparatus and including another license key, a content data decryptor receiving another encrypted content data stored in said data recording apparatus, and decrypting said received another encrypted content data using another license key decrypted by and extracted from said encryption/decryption processing unit, and a control unit, wherein said control unit responds to a transmission request of said content data to said data recording apparatus input via said operation unit to read out said content data in plaintext from said storage unit into said encrypted content generation unit, transmitting said encrypted content data and said encrypted license to said data recording apparatus via said interface, and deleting the content data in plaintext stored in said storage unit, said control unit, in response to a reception request of content data from said data recording apparatus input via said operation unit, receives said another encrypted content data and said another encrypted license, applies said another encrypted content data to said content data decryptor and applies said another encrypted license to said encryption/decryption processing unit.

2. The data terminal device according to claim 1, wherein said encryption/decryption processing unit comprises an encryptor encrypting said license using a first session key applied from said data recording apparatus via said interface to generate an encrypted license, and said control unit receives said first session key from said data recording apparatus via said interface, and applies the received first session key to said encryptor at a writing operation of said encrypted license to said data recording apparatus.

3. The data terminal device according to claim 2, wherein said encryption/decryption processing unit further comprises a session key generator generating a session key to identify communication with said data recording apparatus, and a decryptor decrypting encrypted data using a second session key generated by said session key generator, wherein, in response to said transmission request of content data, said session key generator generates said second session key, and said control unit applies said second session key to said data recording apparatus via said interface, receives from said data recording apparatus via said interface said first session key encrypted with said second session key, and applies said received first session key encrypted with said second session key to said decryptor.

4. The data terminal device according to claim 3, wherein said encryption/decryption processing unit further includes another encryptor encrypting data using a first public key received from and unique to said data recording apparatus, wherein, in response to said transmission request of content data, said decryptor decrypts said first session key and said first public key encrypted with said second session key using said second session key, and extracts said first session key and said first public key, said another encryptor encrypts a license generated by said license generation unit using said first public key, said encryptor receives and encrypts an output of said another encryptor using said first session key, and generates said encrypted license key encrypted with said first session key, and said control unit applies said second session key to said data recording apparatus via said interface, receives from said data recording apparatus via said interface said first session key encrypted with said second session key, and applies said received first session key encrypted with said second session key and said first public key to said decryptor.

5. The data terminal device according to claim 2, wherein said encryption/decryption processing unit further includes another encryptor encrypting data using a public key, wherein, in response to said transmission request of content data, said another encryptor encrypts said second session key using said public key, and said control unit receives authentication data including said public key from said data recording apparatus via said interface, and when determination is made that the received authentication data is proper, applies said public key included in said received authentication data to said another encryptor, and applies said second session key encrypted using said public key in said another encryptor to said data recording apparatus via said interface.

6. The data recording device according to claim 1, wherein said encryption/decryption processing unit comprises
a session key generator generating a session key to identify communication with said data recording apparatus, and
a decryptor decrypting encrypted data using a session key generated by said session key generator,
wherein, in response to said reception request of content data,
said session key generator generates said session key, and
said control unit applies the session key generated by said session key generator to said data recording apparatus via said interface, receives from said data recording apparatus via said interface said another encrypted license encrypted with said session key, and applying said received another encrypted license to a decryptor.

7. The data terminal device according to claim 6, further comprising an authentication data hold unit storing authentication data to be applied to said data recording apparatus in response to said reception request of content data,
wherein said control unit applies said authentication data to said data recording apparatus via said interface, and when said authentication data is attested at said data recording apparatus, receives said another encrypted content data and said another encrypted license from said data recording apparatus.

* * * * *